UNITED STATES PATENT OFFICE.

ARMIN EICHLER, OF NEW YORK, N. Y.

PRIMER AND VARNISH AND PROCESS OF PREPARING SAME.

1,133,432.  Specification of Letters Patent.  Patented Mar. 30, 1915.

No Drawing.   Application filed September 12, 1913.   Serial No. 789,529.

*To all whom it may concern:*

Be it known that I, ARMIN EICHLER, a citizen of the United States of America, and a resident of New York, in the county and State of New York, have invented certain new and useful Improvements in Primers and Varnishes and Processes of Preparing Same, of which the following is a specification.

This invention has reference to novel primers or varnishes which are adapted to be applied as a priming coat for concrete walls, plaster walls, and woodwork and may also be used directly as a varnish.

It is the special object of my invention to produce a primer and varnish which is impervious to water vapor, caustic alkalis, ammonia, and the so-called "saltpeter rot." The saltpeter rot represents the efflorescence on the surface of the walls and forms a white floccular crystalline covering thereon which is strongly alkaline in character. This covering forms in new or damp walls and progresses to the surface of the wall where it blossoms out and forms flocculi. Painted walls are injured by such formation of saltpeter rot and often patches of the paint fall off because parts of the same are eaten away by it.

In order to attain the object of this invention, I prepare a primer and varnish of which the polymerization products of cumarone, derived from coal tar, form an essential part because coal tar products are water and alkali proof. The polymerization products of cumarone are compounded with a suitable solvent while heat is applied when a primer and varnish results directly. The consistency of the primer and varnish depends on the quantity of solvent employed and if desired the final product may be thinned for special applications. The primer and varnish may also be added to the regular finished varnishes to render them impervious to water and alkali and impart this property, to a high degree to them.

In carrying the invention into effect I proceed substantially as follows: The polymerized products of cumarone $(C_8H_6O)_x$ such as paracumarone, for instance, which are resinous products are placed in a suitable vessel and heated preferably up to 160° C. until they are completely melted. Now the solvent or solvents are gradually stirred in while the heating of the mass is continued. When the polymerized products of cumarone and the solvent or solvents have been thoroughly mixed a uniform product is formed which is allowed to cool. The resulting product is directly ready for use or it may be diluted with a solvent or solvents, preferably with the same solvent or solvents that were employed in its preparation. Such solvents may be liquid hydrocarbons of the fatty series such as benzin or gasolene, or benzene from the aromatic series. The group of terpenes gives excellent results because of their inherent property of easily absorbing oxygen, and hardening thereby, when exposed in a spread out condition, as is the case with a spread out primer and varnish. Spirits of turpentine $C_{10}H_{16}$ and similar products of the group of terpenes are used for better grades of primers and varnishes.

The quantities of the polymerization products of cumarone and the solvents employed may vary within reasonable limits according to the desired application of the primer and varnish. For rather porous walls, as found outdoors, the cumarone products should be predominant. For general purposes, however, I prefer to mix about one pound of the polymerized cumarone with about one pound of solvent. The resulting varnish may then be diluted with a solvent if desired.

I claim as my invention:

1. The process of producing a primer and varnish consisting in melting polymerization products of cumarone, incorporating therein a liquid hydrocarbon solvent while continuing to apply heat, and allowing the resulting uniform product to cool.

2. The process of producing a primer and varnish consisting in heating polymerized cumarone to about 160° C. to liquefy the same, incorporating therein a liquid hydrocarbon solvent while continuing to apply heat, and allowing the resulting uniform product to cool.

3. The process of producing a primer and varnish consisting in melting polymerization products of cumarone, incorporating therein a liquid terpene while continuing to apply heat, and allowing the resulting uniform product to cool.

4. The process of producing a primer and varnish consisting in heating polymerized cumarone to about 160° C. to liquefy the same, incorporating therein spirits of turpentine, and allowing the resulting products to cool.

5. As a new article of manufacture a primer and varnish composed of polymerization products of cumarone and liquid hydrocarbon solvents.

6. As a new article of manufacture a primer and varnish composed of polymerization products of cumarone and liquid terpenes.

Signed at New York, N. Y., this 11th day of September, 1913.

ARMIN EICHLER.

Witnesses:
 MARIE LEAHY,
 MAY F. MULLEN.